(12) United States Patent
Ciampini et al.

(10) Patent No.: US 9,574,096 B2
(45) Date of Patent: Feb. 21, 2017

(54) BICOMPONENT REACTIVE INK FOR INK JET PRINTING

(75) Inventors: Davide Ciampini, Arnad (IT); Luigina Gino, Arnad (IT)

(73) Assignee: SICPA HOLDING SA, Prilly (CH)

( * ) Notice: Subject to any disclaimer, the term of this patent is extended or adjusted under 35 U.S.C. 154(b) by 715 days.

(21) Appl. No.: 13/997,034

(22) PCT Filed: Dec. 23, 2010

(86) PCT No.: PCT/EP2010/070664
§ 371 (c)(1),
(2), (4) Date: Jun. 21, 2013

(87) PCT Pub. No.: WO2012/084052
PCT Pub. Date: Jun. 28, 2012

(65) Prior Publication Data
US 2013/0271526 A1  Oct. 17, 2013

(51) Int. Cl.
| | | |
|---|---|---|
| *C09D 11/30* | (2014.01) | |
| *C09D 11/54* | (2014.01) | |
| *B05D 1/34* | (2006.01) | |
| *B05D 1/36* | (2006.01) | |
| *C09D 11/101* | (2014.01) | |
| *C09D 11/38* | (2014.01) | |
| *C08K 3/00* | (2006.01) | |
| *C08K 5/00* | (2006.01) | |

(52) U.S. Cl.
CPC ............ *C09D 11/30* (2013.01); *C09D 11/101* (2013.01); *C09D 11/38* (2013.01); *C09D 11/54* (2013.01); *C08K 3/0016* (2013.01); *C08K 5/0025* (2013.01)

(58) Field of Classification Search
None
See application file for complete search history.

(56) References Cited

U.S. PATENT DOCUMENTS

| | | | |
|---|---|---|---|
| 2006/0074138 A1* | 4/2006 | Sasa | C08G 59/12 522/25 |
| 2007/0110958 A1* | 5/2007 | Meyers | B41J 11/0015 428/141 |

FOREIGN PATENT DOCUMENTS

| | | |
|---|---|---|
| EP | 1591097 B1 | 4/2004 |
| JP | H03-240557 A | 10/1991 |
| JP | H09-286944 A | 11/1997 |
| JP | 2005-081816 A | 3/2005 |
| JP | 2006-159746 A | 6/2006 |
| JP | 2007-112970 A | 5/2007 |

(Continued)

OTHER PUBLICATIONS

Toagosei's Aron Oxetane Technical Information.*

(Continued)

*Primary Examiner* — Vu A Nguyen
(74) *Attorney, Agent, or Firm* — Greenblum & Bernstein, P.L.C.

(57) ABSTRACT

The present invention relates to (i) a reactive ink for ink jet printing comprising a two-component system, the first component comprising a polymerizable monomer, and the second component comprising a polymerization catalyst, wherein the monomer is able to form a polymeric film at low temperature within thirty minutes, preferably within ten minutes, from contacting the catalyst, (ii) a process of making an image on a non-porous substrate using such a reactive ink, and an ink jet print head including a two component ink-system.

19 Claims, 1 Drawing Sheet

(56) References Cited

FOREIGN PATENT DOCUMENTS

WO         00/01777 A1     1/2000
WO     2007/058651 A1     5/2007

OTHER PUBLICATIONS

Machine translation of JP 2007-112970 A.*
Israeli Office Action issued for application No. 227128, mail date is Jan. 1, 2015.
Australian Office Action issued with respect to application No. 2010366131, mail date is Apr. 13, 2015.
JP Office Action dated Mar. 31, 2015 issued in Japanese Application No. JP2013-545062 w/Eng. translation.

* cited by examiner

BICOMPONENT REACTIVE INK FOR INK JET PRINTING

FIELD OF THE INVENTION

The present invention in general relates to a reactive ink for ink jet printing.

More particularly, the present invention relates to a reactive ink for ink jet printing comprising a two-component system, the first component comprising a polymerizable monomer, and the second component comprising a polymerization catalyst.

BACKGROUND OF THE INVENTION

Ink jet devices known in the art are divided in continuous stream devices and drop-on-demand devices.

In continuous stream devices, the ink is sprayed with a continuous stream of droplets through at least one nozzle. The droplets are electrostatically charged as they leave the nozzle and are deflected in flight by the application of high voltage pulses to a set of deflector plates. The trajectory of each drop, and then its contact position with the substrate to be printed, is accurately controlled.

In drop-on-demand devices, the ink is sprayed from a nozzle directly to a specific position of the substrate following the input of a digital system which positions the nozzle and provides the ejection of the droplets.

The present invention relates to an ink for drop-on-demand devices.

Drop-on-demand devices are mainly of three kinds. A first kind of device consists in a piezoelectric system which comprises a head fed with an ink which is ejected from a nozzle by a piezoelectric transducer which produces a pressure pulse. A second kind consists in an acoustic system employing the ability of a sound pulse of provoking the release of droplets from a liquid surface. A third kind consists in a thermal system which comprises a head equipped with a thermal resistance and fed with an ink. The thermal resistance causes the evaporation of the ink solvent (usually water) and the formation of a bubble, which in turn causes the ink ejection through the head nozzle.

In the field of printing on non-porous surfaces, like those of plastic, glass, metal, and composite materials, it is possible to use the above mentioned ink jet printing technologies.

The drop-on-demand ink jet printing technology shows some fundamental advantages in industrial printing, like a reduced ink consumption, a high image definition, and a low cost.

The fixing of the ink ejected by ink-jet technology on non-porous surfaces can be done with different methodologies. For example, the ink may be able to chemically attack the surface of the substrate so as to convey the colorant by means of a solvent within the substrate. Alternatively, the ink may comprise reactive components able to polymerise by thermal or photochemical treatments and to form a film which fixes and keeps the colorant on the surface of the substrate.

Both these techniques have drawbacks.

The first technique works only if the substrate to be printed is attacked by the ink solvent. Accordingly, the inks so formulated can be used only with plastic supports which are easily attacked by the ink solvents. In the case of printing on glass, metal or other surfaces with high chemical resistance it is necessary to resort to other techniques.

The second technique requires that the printed ink may be heated at high temperatures or exposed to UV-radiations to promote the polymerisation.

However, thermal polymerizable inks cannot be used with thermal ink-jet systems, as the temperature reached in the ejecting chamber would promote the polymerization of the ink components. Thermal polymerizable inks could be used with piezoelectric ink-jet systems, but still there are stability problems under storage which could result in the clogging of the printing head and require the storage at temperature below 0° C. Further, the use of high temperature for the polymerisation of the inks limits the type of substrates to be printed to those with high thermal stability.

The use of UV-polymerizable inks makes difficult the polymerisation of three-dimensional objects or surfaces which are not perfectly planar. Moreover, the total cost and the overall dimensions of a printer with a device for polymerisation is considerably higher. Besides that, reactive inks—where both reactive monomers or oligomers and polymerisation catalyst are mixed together in the same composition—are more likely to be unstable over time and to be more prone to clog the nozzles negatively affecting the printhead reliability.

Patents and patent applications disclosing reactive ink compositions having the above mentioned disadvantages are for example U.S. Pat. No. 5,380,769, U.S. Pat. No. 7,632,546, U.S. Pat. No. 7,563,489, US 2008/00384, and US 2008/0295731.

U.S. Pat. No. 7,632,546 discloses a radiation curable phase change ink preferably used in piezoelectric ink jet devices, comprising an ink vehicle that includes at least one gellant comprised of a curable polyamide-epoxy acrylate component and a polyamide component, and at least one colorant. U.S. Pat. No. 7,563,489 discloses radiation curable phase change ink preferably used in piezoelectric ink jet devices. The ink comprises an ink vehicle that includes at least one curable epoxy-polyamide gellant, and at least one colorant.

US 2008/00384 discloses a radiation curable phase change ink comprising an ink vehicle that includes at least one curable carrier, at least one gellant, at least one curable wax and at least one photoinitiator.

U.S. Pat. No. 5,380,769 discloses a reactive ink compositions comprising at least two reactive components, a base ink component and a curing component, that are applied to a receiving substrate separately. The base ink component includes an ink carrier, a compatible colorant, and a cross-linkable constituent, and the curing component is a cross-linking agent. Upon exposure of the base ink component to the curing component, at least a portion of the ink is cross-linked to provide a printed image that is durable and abrasion-resistant.

US 2008/0295731 discloses a reactive ink set including three mixtures of radically polymerizable monomers. A first mixture includes a peroxide, a second mixture includes a peroxide decomposition agent, and an optional third mixture that does not include a peroxide or a peroxide decomposition agent. The first mixture and the second mixture polymerize to form a solid ink on the substrate following jetting in the liquid state.

SUMMARY OF THE INVENTION

The Applicant has developed an ink and an ink jet printing method able to overcome one or more of the above mentioned drawbacks.

The Applicant has surprisingly found that the above mentioned problems can be overcome by a reactive ink for ink jet printing comprising a two-component system, the first component comprising a polymerizable monomer, and the second component comprising a polymerization catalyst.

In particular, the Applicant has developed a reactive ink for ink jet printing comprising a two-component system, the first component comprising a polymerizable monomer, and the second component comprising a polymerization catalyst, wherein the monomer is able to form a polymeric film at low temperature within thirty minutes, preferably within ten minutes, from contacting the catalyst.

The expression "low temperature" means, for the scope of the present description and the appended claims, a temperature lower than 80° C.

The Applicant has also developed a method to employ the above mentioned reactive ink, having a high reactivity, without incurring in undesired polymerization or property variations within the printing head during stationary phases or storage.

The method comprises the step of separately jetting the two components of a bicomponent reactive ink composition onto a non-porous substrate, wherein the jetting of the two components can be provided simultaneously or successively by using a multichamber printing head with two or more ink tanks and hydraulic systems or by using two or more single chamber printing heads, with a one pass or a multi pass application.

At least one of the two components of the ink, preferably both of them, comprises the colorant and the other ingredients known in the art to confer to the ink the properties needed to have a good ejectability from the printing head, the proper viscosity and the proper wettability to the substrate. The polymerisation catalyst and the monomer will mix each other on the substrate, so forming a polymeric film able to keep and protect the colorant with good adhesion to the substrate.

Accordingly, a first aspect of the present invention relates to a reactive ink for ink jet printing comprising a two-component system, the first component comprising a polymerizable monomer, and the second component comprising a polymerization catalyst, wherein the monomer is able to form a polymeric film at low temperature within thirty minutes, preferably within ten minutes, from contacting the catalyst.

In a second aspect, the present invention also relates to a process of making an image on a non-porous substrate, the process comprising jetting a reactive ink composition onto said non-porous substrate, wherein said reactive ink composition comprises a first component comprising a polymerizable monomer, and a second component comprising a polymerization catalyst, wherein the monomer is able to form a polymeric film at low temperature within thirty minutes, preferably within ten minutes, from contacting the catalyst.

In a third aspect, the present invention also relates to an ink jet print head including a two component ink-system. The print head comprised a first tank including a first ink component comprising a polymerizable monomer, a second tank including a second ink component comprising a polymerization catalyst, and separate ejection systems for the first and second ink components.

DETAILED DESCRIPTION

The reactive ink of the present invention comprises a two-component system, the first component comprising a polymerizable monomer, and the second component comprising a polymerization catalyst.

Advantageously, the first and second component are employed in an amount so as to provide a polymerizable monomer to polymerization catalyst weight ratio ranging from 1:1 to 1:10, preferably from 1:1 to 1:5, and more preferably from 1:1 to 1:3.

At least one of the two components of the ink, preferably both of them, comprises the colorant and the other ingredients known in the art to confer to the ink the properties needed to have a good ejectability from the printing head. However, the colorant may be omitted when the purpose of the method is to provide a protective film on a non-porous substrate.

The reactive ink of the present invention commonly includes a carrier medium wherein all the ingredients are dissolved or dispersed.

Polymerizable Monomer

The polymerizable monomer comprised in the first component of the reactive ink of the present invention is an epoxy monomer having at least one epoxy group. The epoxy monomers useful in the present invention include those described in "Chemistry and Technology of the Epoxy Resins", B. Ellis, Chapman Hall 1993, New York and "Epoxy Resins Chemistry and Technology", C. May and Y. Tanaka, Marcell Dekker 1972, New York. Epoxy monomers that can be used for the present invention include those that could be produced by reaction of a hydroxyl, carboxyl or amine containing compound with epichlorohydrin, preferably in the presence of a basic catalyst, such as a metal hydroxide, for example sodium hydroxide. Also included are epoxy resins produced by reaction of a compound containing at least one and preferably two or more carbon-carbon double bonds with a peroxide, such as a peroxyacid.

The polymerizable monomer useful in the present invention is capable to form a polymeric film at a temperature lower than 80° C. in a period of time equal to or lower than thirty minutes.

Advantageously, the polymerizable monomer useful in the present invention is capable to form a polymeric film at a temperature equal to or lower than 60° C., preferably equal to or lower than 40° C., and more preferably between 30° and 10° C. in a period of time equal to or lower than thirty minutes, preferably equal to or lower than ten minutes, and more preferably equal to or lower than one minute from contacting the catalyst, in particular an acid catalyst of sufficient acid strength.

The epoxy monomers useful in the present invention include aliphatic epoxy monomers, alicyclic epoxy monomers, and aromatic epoxy monomers.

The aliphatic epoxy monomer is a monomer having an aliphatic chain and at least one epoxy group. The alicyclic epoxy monomer is a monomer having an alicyclic ring and at least one epoxy group. The aromatic epoxy monomer is a monomer having an aromatic ring and at least one epoxy group.

Preferably, the epoxy monomer of the present invention comprises two epoxy groups linked to an aliphatic, alicyclic or aromatic moiety.

The aliphatic, alicyclic or aromatic moiety bearing the epoxy groups advantageously further includes one or more functional groups, such as, for example an amido group, an ester group, an ether group, and the like.

The aliphatic, alicyclic or aromatic moiety bearing the epoxy groups can be further substituted with one or more conventional substituent, like a halogen atom, a hydroxy group, an alkyl group, an alkoxy group, an amino group, and so on.

Preferred epoxy monomers useful in the present invention are cycloaliphatic and aliphatic epoxy monomer.

Aliphatic epoxy monomers include compounds that contain at least one aliphatic group, including $C_4$-$C_{20}$ aliphatic group or polyglycol group. Preferred examples of aliphatic epoxy monomer useful in the present invention include butadiene dioxide, dimethylpentane dioxide, diglycidyl ether, 1,4-butanediolgiglycidyl ether, diethylene glycol diglycidyl ether, and dipentene dioxide. Such aliphatic epoxy resins are available commercially, such as DER 732 and DER 736 from Dow.

Preferred examples of alicyclic epoxy monomer useful in the present invention include (3'-4'-Epoxycyclohexane) methyl 3'-4'-Epoxycyclohexyl-carboxylate (Celloxide 2021P by Daicel Chemical Industries), 2-(3,4-epoxy)cyclohexyl-5,5-spiro-(3,4-epoxy)cyclohexane-m-dioxane, 3,4-epoxycyclohexylalkyl-3,4-epoxy cyclohexanecarboxylate, 3,4-epoxy-6-methylcyclohexylmethyl-3,4-epoxy-6-methylcyclohexanecarboxylate, vinyl cyclohexanedioxide, bis(3,4-epoxycyclohexylmethyl)adipate, bis(3,4-epoxy-6-methylcyclohexylmethyl)adipate, exo-exo bis(2,3-epoxycyclopentyl)ether, endo-exo bis(2,3-epoxycyclopentyl)ether, 2,2-bis(4-(2,3-epoxypropoxy) cyclohexyl)propane, 2,6-bis(2,3-epoxypropoxycyclohexyl-p-dioxane), 2,6-bis(2,3-epoxypropoxy)norbornene, the diglycidylether of linoleic acid dimer, limonene dioxide (Celloxide 3000 by Daicel Chemical Industries), 2,2-bis(3, 4-epoxycyclohexyl)propane, dicyclopentadiene dioxide, 1,2-epoxy-6-(2,3-epoxypropoxy)hexahydro-4,7-methanoindane, p-(2,3-epoxy)cyclopentylphenyl-2,3-epoxypropylether, 1-(2,3-epoxypropoxy)phenyl-5,6-epoxyhexahydro-4, 7-methanoindane, o-(2,3-epoxy)cyclopentylphenyl-2,3-epoxypropyl ether, 1,2-bis(5-(1,2-epoxy)-4,7-hexahydromethanoindanoxyl)ethane, cyclopentenylphenyl glycidyl ether, cyclohexanediol diglycidyl ether, and diglycidyl hexahydrophthalate.

Advantageously, the alicyclic epoxy resin is the (3'-4'-Epoxycyclohexane)methyl 3'-4'-Epoxycyclohexyl-carboxylate (Celloxide 2021P by Daicel Chemical Industries).

Aromatic epoxy resins may also be used with the present invention. Examples of aromatic epoxy resins useful in the present invention include bisphenol-A epoxy resins, bisphenol-F epoxy resins, phenol novolac epoxy resins, cresolnovolac epoxy resins, biphenol epoxy resins, biphenyl epoxy resins, 4,4'-biphenyl epoxy resins, polyfunctional epoxy resins, divinylbenzene dioxide, and 2-glycidylphenylglycidyl ether.

Advantageously, the aromatic epoxy resin is diglycidyl ether of bisphenol-F (DGEBF), and diglycidyl ether of bisphenol-A (DGEBA).

Combinations of two or more epoxy monomers and oligomers may be used in the present invention.

Polymerization Catalyst

The polymerization catalyst comprised in the second component of the reactive ink of the present invention is a compound able to promote the acid (cationic) polymerization of the epoxy monomer.

The Applicant has found that the polymerization of epoxy monomer in the present invention can be a cationic or acid-catalyzed polymerization (or homopolymerization).

Lewis acids are most commonly employed, but appropriate Bronsted acids can also be utilized.

The Applicant has found that in order to polymerize the epoxy monomer at a temperature lower than 60° C., preferably lower than 40° C., and more preferably between 30° and 10° C. in a period of time equal to or lower than thirty minutes, preferably equal to or lower than ten minutes, and more preferably equal to or lower than one minute, an acid catalyst of sufficient acid strength is required.

The acid strength required will depend on the nature of the epoxy monomer starting material. For example, alicyclic epoxy monomers are much more reactive than aromatic epoxy monomers, and then the latter will require a stronger acid. Another requirement of the acid catalyst is that it has to be stable in the carrier medium for sufficient time to give the desired technical effect, or that the products of the reaction of the acid a suitable polar carrier are themselves acids of sufficient strength to achieve the desired technical effect.

The acid catalyst useful in the present invention is any acid having a pKa equal to or lower than 4, preferably equal to or lower than 2, and especially a superacid.

Suitable acids include mineral acids, organic sulfonic acids and superacids.

Mineral acids include sulfuric acid, hydrochloric acid, perchloric acid, nitric acid, phosphoric acid, and the like.

Organic sulfonic acids include both aromatic and aliphatic sulfonic acids. Representative sulfonic acids that are commercially available include methanesulfonic acid, trifluoromethanesulfonic acid, benzenesulfonic acid, dodecylbenzenesulfonic acid, dodecyl diphenyl oxide sulfonic acid, 5-methyl-1-naphthylenesulfonic acid, and p-toluenesulfonic acid.

Superacids are a particularly useful class of acid for the purposes of this invention and are defined as acidic substances that are stronger in acidity than 100% sulfuric acid. They are described in G. A. Olah, G. K. S. Prakash, A. Molnar and J. Sommer, Superacid Chemistry, Wiley-Interscience, 2009.

Useful superacids include perchloric acid, fluorosulfuric acid, trifluoromethanesulfonic acid, and perfluoroalkylsulfonic acids. They also include Lewis superacids such as $SbF_5$, $TaF_5$, $NbF_5$, $PF_5$, and $BF_3$. and their combination with hydrogen fluoride to give $HSbF_6$, $HTaF_6$, $HNbF_6$, $HPF_6$, and $HBF_4$.

Particularly useful acids for this invention include perchloric acid, orthophosphoric acid, trifluoromethanesulfonic acid, tetrafluoroboric ($HBF_4$), and hexafluoroantimonic acid ($HSbF_6$).

Carrier Medium

The reactive ink compositions employed in the practice of the invention commonly include a carrier medium comprised of at least one solvent. However, it is intended that the teaching of this invention may be applied to other appropriate carrier media, as well.

The carrier medium may be any solvent able to dissolve or disperse the other ingredients of the reactive ink compositions, and to sustain the drops formation and ejection through the inkjet printhead. In case the reactive ink compositions are ejected through an inkjet printhead of the thermal type, the carrier medium shall have specific critical properties to allow the generation of a vapor bubble large enough to displace the desired drop volume. Water is the usual choice as carrier medium for thermal ink-jet inks and it is largely employed in inks for consumer ink-jet printers for various applications, because water is both a safe and effective carrier medium and because water has superior volume expansion when going from liquid to steam.

However, when printing is carried out on non porous substrates, the use of water as principal carrier medium causes critical drawbacks in which the ink is often repelled from the surface of substrate, especially when printing on low surface energy substrates like plastics, and the drying rate of the ink on the substrate is low.

The preferred carrier for the reactive ink compositions of the present invention comprises at least one organic solvent in which the functional ingredients of the reactive ink compositions are easily soluble or dispersible. Water may be introduced in the carrier medium where necessary to impart specific properties, such as promoting the complete dissociation of the polymerization catalyst, or as an adjunct to the formation of vapor bubble when thermal inkjet printing is used.

Suitable examples of an organic solvent useful as carrier medium include: alcohols, such as methyl alcohol, ethyl alcohol, n-propyl alcohol, isopropyl alcohol, n-butyl alcohol, sec-butyl alcohol, or tert-butyl alcohol; amides, such as dimethylformamide or dimethylacetamide; carboxylic acids; esters, such as ethyl acetate, ethyl lactate, and ethylene carbonate; ethers, such as tetrahydrofuran or dioxane; glycerine; glycols; glycol esters; glycol ethers; ketones, such as acetone, diacetone, methyl ethyl ketone or methyl isobutyl ketone; lactams, such as N-isopropyl caprolactam or N-ethyl valerolactam; lactones, such as butyrolactone; organosulfides; sulfones, such as dimethylsulfone; organosulfoxides, such as dimethyl sulfoxide or tetramethylene sulfoxide; and derivatives thereof and mixtures thereof. Among these organic solvents, alcohols are preferred. Advantageously, ethyl alcohol, methyl alcohol, isopropyl alcohol, n-propyl alcohol or mixture thereof are preferably employed in the reactive ink compositions of the present invention.

The reactive ink of the present invention can also be used on plastic surfaces or other substrates which are attacked by organic solvents. In such a case, the reactive ink of the present invention can comprise aggressive solvents like, for example, xylene, dimethylformamide (DMF), N-methyl-2-pyrrolidone, (NMP), 1,3-dimethyl-2-imidazolidinone (DMI), dimethylsulfoxide (DMSO), γ-butyrolactone, ϵ-caprolactone.

Colorant

No particular limitation is imposed on the type or the amount of colorant used. The colorant useful in the present invention may be a dye or a pigment.

Examples of dyes that may be used in the practice of the present invention include any of the acid dyes, direct dyes, food dyes, and reactive dyes described in The Color Index. Dyes which are not described in The Color Index can also be used. Dyes useful in the present invention include anionic, cationic, amphoteric, and non-ionic dyes.

Particularly useful dyes that may be used in the practice of the present invention include those substantially or completely soluble in the organic solvents, commonly described in The Color Index as solvent dyes. Examples of dyes that may be used in the practise of the present invention include: black solvent dyes inclusive of Intraplast Black RL; Neopen Black X 55; Orasol Black RL; Orasol Black RLI; Orasol Black RLP; Orient Black 3808; Solvent Black 29; ValiFast Black 3806; ValiFast Black 3808; ValiFast Black 3810; solvent yellow dyes inclusive of Intraplast Yellow 2GLN, Neozapon Yellow 081, Neozapon Yellow 141, Valifast Yellow 4120, Valifast Yellow 4121; magenta dyes such as Neozapon Red 492, Orasol Red 2 BL, Intraplast Red G, Valifast Red 3311, Valifast Red 3312; cyan dyes Orasol Blue 2 GLN, Neozapon Blue 807, Orasol Blue GN, Intraplast Brilliant Blue GN, Valifast Blue 1605, Uniflow Blue 1100, Valifast Blue 2620, and mixtures thereof.

Other useful examples of dyes that may be used in the practice of the present invention include Food Black 2, a mixture of azoic dyes (Bayscript Schwarz N01-Bayer), Direct Black 168 and Direct Black 195 for the black inks, and the dyes Direct Blue 86, Direct Blue 199, Acid Blue 9, Acid Yellow 23, Direct Yellow 86, Acid Red 52 and Acid Red 249 for the color inks.

The aforementioned dyes may be added in effective amount depending on the desired color intensity and the organic solvent solubility. Suitable amounts may be for example, from about 0.5% by weight to about 25% by weight, and preferably from about 1% by weight to about 5% by weight.

The aforementioned dyes may be added to both parts of the inks or just on one part. When added to both parts of the ink the amount may be the same for both parts or may be different.

A wide range of pigments, organic and inorganic, may be used either alone or in combination. Pigments with acidic or basic functional groups or with polymers on their surface are particularly useful.

When the application involves printing with an ink jet ink printer, the pigment particles need to be small enough in size so that they move freely through the printing device. Because the ejecting nozzles of inkjet ink printers range in diameter from about 10 to 100 microns, pigments suitable for use in the present invention may have a range of particle sizes from about 0.01 microns to 10 microns, preferably from about 0.01 microns to 1 microns, and more preferably from about 0.01 microns to 0.5 microns.

Where a pigment is employed in the present invention as a coloring agent, the amount of the pigment in the total ink is between 1 to 20%, preferably between 2 to 5%.

Examples of a pigment that may be used in the practice of the present invention for a yellow ink include C.I. Pigment Yellow 1, C.I. Pigment Yellow 3, and C.I. Pigment Yellow 13. Examples of a pigment that may be used in the present invention for a magenta ink include C.I. Pigment Red 5, C.I. Pigment Red 7, C.I. Pigment Red 12, C.I. Pigment Red 112, and C.I. Pigment Red 122. Examples of a pigment that may be used in the present invention for a cyan ink include C.I. Pigment Blue 1, C.I. Pigment Blue 2, C.I. Pigment Blue 16, C.I. Vat Blue 4, and C.I. Vat Blue 6. Carbon black may be used as a pigment. Any useful commercially available form of carbon black, such as, for example, acetylene black, channel black, furnace black, lampblack and thermal black can be advantageously employed. Examples of carbon black pigments which are available commercially include ACRYJET Black-357 (Polytribo), BONJET CW-1 (Orient Chemical Corporation), DISPERS Jet Black 1 (BASF), and NOVOFIL Black BB-03 (Hoechst Celanese Corporation).

Fine particles of metal or metal oxides also may be included as colorants for the compositions of the present invention. Metal and metal oxides are used in the preparation of magnetic and conductive inkjet inks. Typically, fine particles of iron and iron oxides are used in the preparation of magnetic inks, but other metals and metal oxides can be advantageously added, such as chromium, manganese, zinc, cobalt, nickel, and the like. Fine particles of silver, gold and copper, alone or as an alloy, or like plated particles, advantageously with other conductive metals like iron, cobalt, nickel, cadmium, indium, tin, thallium, lead, molybdenum, and bismuth are used in the preparation of conductive inks. Nanoparticles of silver are particularly preferred for the preparation of conductive inks.

Other Components

In addition to the above described ingredients, the reactive ink compositions employed in the present invention may contain surfactants, defoamers, sequestering agents, and biocides, if required or desired. Other ingredients are not excluded.

One or more defoamers effective in preventing the foaming of an ink or liquid composition can be used, preferably in the range from about 0.01% to 1%, and more preferably in the range from about 0.05% to 0.1%. Suitable defoamers include silicone defoamers and acetylenic defoamers. Examples of silicone defoamers include DC-150 (Dow Corning Co.) and Silwet™ 720 (Union Carbide Co.). An example of an acetylenic defoamer includes Surfonyl™ 104 PG50 (Air Products and Chemical Co.).

One or more surfactants, typically from about 0.01% to about 5%, preferably from 0.5 to 2.0%, may be added to improve the wettability of the reactive ink compositions on the reactive surface. Examples of such wetting agents include Atlas™ (cationic ether sulfate surfactant, ICI Americas) and Fluorad™ FC 430 (fluoroaliphatic polymer ester coating additive, 3M Company). Selection of the surfactants is particularly important in terms of adjusting the permeability of the compositions into the recording medium.

One or more sequestering agents may be used to prevent the deleterious effects of heavy metals. Examples include sodium ethylene diamine tetraacetate, sodium nitrilotriacetate, sodium hydroxyethyl ethylene diamine triacetate, sodium diethylene triamine pentaacetate, and sodium uramil diacetate.

One or more biocides may be incorporated, in an amount of from about 0.001% to 4%, to prevent the growth of microorganisms. Examples of such biocides include commercial biocides, such as a mixture of semiformal glycols and isothiazolinones (Preventol™D6, Bayer) and 1,2-benzoisothioazolin-3-one (Proxel™, Zeneca Corp.).

The reactive ink of the present invention can be advantageously employed with thermal or piezoelectric ejection heads well known in the art of conventional printing and document production.

As is known to those of skill in the art, thermal and piezoelectric ejection heads typically have an ejection system comprising at least the following components: (a) an orifice; (b) an ejection chamber; and (c) an actuating element, which can be a heating or piezoelectric element. Ejection heads are typically formed on a silicon substrate comprising the electronic components to operate the actuating element.

The size of the orifice is sufficient to produce a spot of suitable dimensions on the substrate surface, where the orifice generally has a diameter ranging from about 1 to 1000 µm, usually from about 5 to 100 µm and more usually from about 10 to 60 µm.

The ejection chamber has a volume ranging from about 1 pl to 10 nl, usually from about 10 pl to 5 nl and more usually from about 35 pl to 1.5 nl.

The actuating element is realized to deliver a quick energy pulse, either in the thermal or pressure form. The heating element is capable of achieving temperatures sufficient to vaporize a sufficient volume of the ink in the ejection chamber to produce a drop of a predetermined volume of biological fluid from the orifice. Generally, the heating element is capable of attaining temperatures of at least about 100° C., usually at least about 400° C., and more usually at least about 700° C., where the temperature achievable by the heating element may be as high as 1000° C. or higher. The piezoelectric element is capable to change its dimension and to reduce the volume of the ejection chamber under the action of an electrical pulse to produce a pressure able to eject a drop of a predetermined volume of ink from the orifice.

The ejection chamber is connected through a hydraulic system to a tank containing the ink. The tank can be a separate container or integrated with the thermal or piezoelectric ejection head to form an ink-jet cartridge.

The reactive ink of the present invention is used with thermal or piezoelectric ejection heads comprising at least two separate ejection systems, at least a first one for the first component comprising a polymerizable monomer, and at least a second one for the second component comprising a polymerization catalyst.

Figure 1:
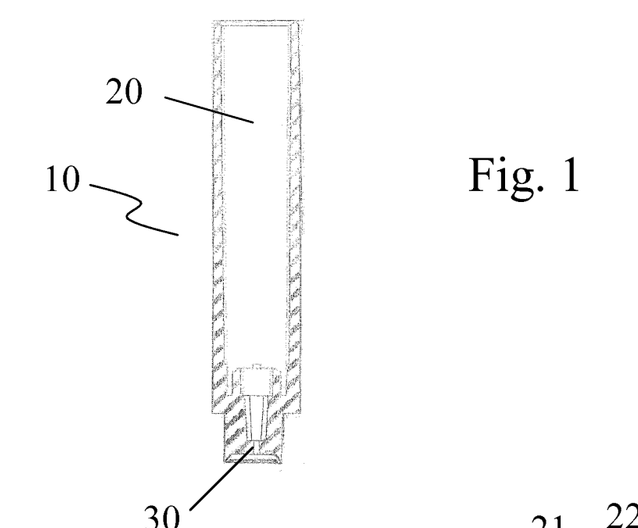
FIG. 1 is a schematic cross sectional view of a printing head.
Figure 2:
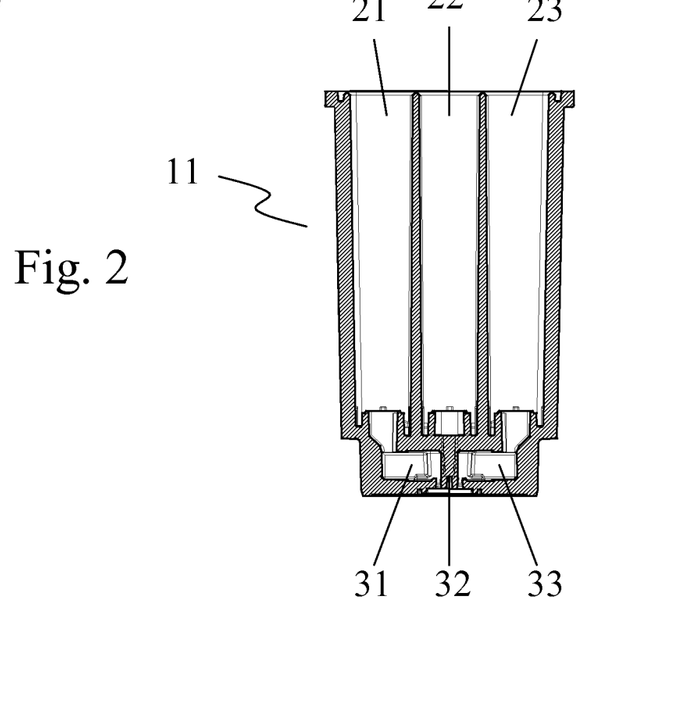
FIG. 2 is a schematic cross sectional view of a trichromic printing head.

Conventional printing heads widely employed in ink-jet printers can be used. Two separate conventional printing heads can be used. As illustrated in FIG. 1, each printing head 10 comprises a tank 20 (containing one component of the reactive ink of the present invention) and an ejection system 30. Alternatively, as illustrated in FIG. 2, a conventional trichromic printing head 11 can be used. The printing head 11 comprises three separate tanks 21, 22, and 23 each connected with three separate ejection systems 31, 32, and 33. The first component is contained in one tank (for example tank 21) and the second component is contained in the other two tanks (for example 22 and 23). Any other combination can be practiced for the purpose of the present invention. For example, a multicolor printing head can comprise, for each color, a combination of two tanks and two separate ejection systems, each connected to a tank. E.g., a combination of six tanks and six separate ejection systems can be adopted for a three color printing head.

The present invention will be further illustrated below by means of a number of preparation and evaluation examples of adhesive composition, which are given for purely indicative purposes and without any limitation of this invention.

EXAMPLES

The following Table 1 shows the composition of the first component of the reactive ink of the present invention (M1-M3) comprising the polymerizable monomer together with other conventional ingredients for ink formulations.

TABLE 1

|  | M1 | M2 | M3 |
|---|---|---|---|
| Celloxide 2021P | 27.5 | 40 | 10 |
| Intraplast Brilliant Blue GN | 3.75 | 3.75 | 3.75 |
| Silquest A187 | 10 | 10 | 4 |
| BYK 346 | 1.25 | 1.25 | 1.25 |
| BYK 380 | 1.25 | 1.25 | 1.25 |
| Ethanol | 56.25 | 43.75 | 81.25 |

Celloxide 2021P is (3'-4'-Epoxycyclohexane)methyl 3'-4'-Epoxycyclohexyl-carboxylate, available from Daicel Chemical Industries.

Intraplast Brilliant Blue GN is the trade name of the Solvent Blue 67 provided by Sensient Technologies Corporation.

Silquest A187 is an epoxy functional silane, available from Momentive Performance Materials Inc.

BYK 346 is a solution of a polyether modified dimethylpolysiloxane in dipropyleneglycol monomethylether, available from Byk Chemie; Wallingford, Conn.

BYK 380 is a solution of a acrylic nonionic copolymer in dipropylene glycol monomethylether, available from Byk Chemie; Wallingford, Conn.

The following Table 2 shows the composition of the second component of the reactive ink of the present invention, comprising the polymerization catalyst (grouped under A) together with other conventional ingredients for ink formulations (grouped under B).

TABLE 2

|   | | C1 | C2 | C3 | C4 | C5 | C6 | C7 | C8 | C9 |
|---|---|---|---|---|---|---|---|---|---|---|
| A | Hexafluoroantimonic acid | 55 | 55 | — | — | — | — | — | — | — |
|   | Ortophosphoric acid (85% w/w) | — | — | 55 | — | — | — | — | — | — |
|   | Sulfuric acid (96% w/w) | — | — | — | 55 | — | — | — | — | — |
|   | Acetic acid (100% w/w) | — | — | — | — | 55 | — | — | — | — |
|   | Lactic acid (100% w/w) | — | — | — | — | — | 55 | — | — | — |
|   | Jeffamine T-403 | — | — | — | — | — | — | 15 | — | — |
|   | $NH_4OH$ (25% w/w) | — | — | — | — | — | — | — | 55 | — |
|   | KOH (0.1M) | — | — | — | — | — | — | — | — | 55 |
| B | Ethanol | 44 | — | 44.8 | 44.8 | 44.8 | 44.8 | 60 | 44.8 | 44.8 |
|   | Isopropanol | — | 44 | — | — | — | — | — | — | — |
|   | $H_2O$ | — | — | — | — | — | — | 24 | — | — |
|   | BYK 307 | — | — | 0.2 | 0.2 | 0.2 | 0.2 | — | 0.2 | 0.2 |
|   | BYK 346 | 1 | 1 | — | — | — | — | 1 | — | — |

Jeffamine ® T-403 is a polyether triamine, available from Huntsman Corporation, Everberg, Belgium.
BYK 307 is a polyether modified polydimethylsiloxane, available from Byk Chemie; Wallingford, Conn.
BYK 346 is a solution of a polyether modified dimethylpolysiloxane in dipropyleneglycol monomethylether, available from Byk Chemie; Wallingford, Conn.

The first components M1-M3 were separately mixed with the second components C1-C9 with a monomer to catalyst weight ratio of 1:1 according to the following Table 3, and the polymerization time at different temperatures was measured for each mix. The polymerization time is expressed as time to tack free, i.e., the time needed to form a polymeric film which is not tacky to the finger contact. The conversion percentage is expressed as molar percentage of epoxy functionality converted in less than 1 minute. The results are also summarized in Table 3.

TABLE 3

|   | First component Monomer | Second component Catalyst | Time to tack free at 20° C. | % conv. | Time to tack free at 40° C. | % conv. | Time to tack free at 60° C. | % conv. |
|---|---|---|---|---|---|---|---|---|
| Inv | M1 | C1, C2, C3, C4 | ≤1 m | ≥70 | ≤1 m | ≥70 | ≤1 m | ≥70 |
| Comp | M1 | C5, C6 | >24 h | — | >24 h | — | >24 h | — |
| Comp | M1 | C7, C8, C9 | >24 h | — | >24 h | — | >24 h | — |
| Inv | M2 | C1, C2, C3, C4 | ≤6 m | ≥70 | ≤1 m | ≥70 | ≤1 m | ≥70 |
| Comp | M2 | C5, C6 | >24 h | — | >24 h | — | >24 h | — |
| Comp | M2 | C7, C8, C9 | >24 h | — | >24 h | — | >24 h | — |
| Inv | M3 | C1, C2 | ≤1 | ≥70 | ≤1 | ≥70 | ≤1 | ≥70 |
| Inv | M3 | C3, C4 | ≤30 m | ≥70 | ≤6 m | ≥70 | ≤1 | ≥70 |
| Comp | M3 | C5, C6 | >24 h | — | >24 h | — | >24 h | — |
| Comp | M3 | C7, C8, C9 | >24 h | — | >24 h | — | >24 h | — |

Inv = invention
Comp = comparison
m = minutes
h = hours

The test was repeated by using a monomer to catalyst weight ratio of 1:2. The results are summarized in Table 4.

TABLE 4

|   | First component Monomer | Second component Catalyst | Time to tack free at 20° C. | % conv. | Time to tack free at 40° C. | % conv. | Time to tack free at 60° C. | % conv. |
|---|---|---|---|---|---|---|---|---|
| Inv | M1 | C1, C2, C3, C4 | ≤1 m | ≥70 | ≤1 m | ≥70 | ≤1 m | ≥70 |
| Comp | M1 | C5, C6 | >24 h | — | >24 h | — | >24 h | — |
| Comp | M1 | C7, C8, C9 | >24 h | — | >24 h | — | >24 h | — |
| Inv | M2 | C1, C2, C3, C4 | ≤6 m | ≥70 | ≤1 m | ≥70 | ≤1 m | ≥70 |
| Comp | M2 | C5, C6 | >24 h | — | >24 h | — | >24 h | — |
| Comp | M2 | C7, C8, C9 | >24 h | — | >24 h | — | >24 h | — |
| Inv | M3 | C1, C2 | ≤1 m | ≥70 | ≤1 m | ≥70 | ≤1 m | ≥70 |
| Inv | M3 | C3, C4 | ≤30 m | ≥70 | ≤6 m | ≥70 | ≤1 m | ≥70 |

TABLE 4-continued

|  | First component Monomer | Second component Catalyst | Time to tack free at 20° C. | % conv. | Time to tack free at 40° C. | % conv. | Time to tack free at 60° C. | % conv. |
|---|---|---|---|---|---|---|---|---|
| Comp | M3 | C5, C6 | >24 h | — | >24 h | — | >24 h | — |
| Comp | M3 | C7, C8, C9 | >24 h | — | >24 h | — | >24 h | — |

Inv = invention
Comp = comparison
m = minutes
h = hours

The best results were obtained with the combination of the first component M1 with the second components C1, C2, C3, or C4 and with the combination of the first component M3 with the second component C1 or C2. In such a case, the time to tack free was lower than or equal to 1 minute at any temperature and with any monomer to catalyst weight ratio.

Good results were also obtained with the combination of the first component M2 with the second components C1, C2, C3, or C4. In such a case, the time to tack free was lower than or equal to 1 minute at 40° C. and 60° C. and with any monomer to catalyst weight ratio. Anyway, the time to tack free at 20° C. was still lower than or equal to 6 minutes.

Favorable results were also obtained with the combination of the first component M3 with the second components C3 or C4. In such a case, the time to tack free was lower than or equal to 1 minute at 60° C. and with any monomer to catalyst weight ratio. Anyway, the time to tack free at 40° and 20° C. was still lower than or equal to 6 and 30 minutes, respectively.

All the other combinations did not give useful results. The polymerisation time was monitored for 24 hours, and it was observed that the mixed combinations were still tacky after 24 hours.

The invention claimed is:

1. A reactive ink for ink jet printing comprising:
   an organic solvent as a carrier medium; and
   a two-component system,
      the first component comprising a polymerizable monomer selected from the group consisting of aliphatic epoxy monomers, alicyclic epoxy monomers, aromatic epoxy monomers, and mixtures thereof, and
      the second component comprising a polymerization catalyst selected from the group consisting of Lewis and Bronsted acids having a pKa equal to or lower than 4,
   wherein the polymerizable monomer is able to form a polymeric film at a temperature equal to or lower than 60° C. within thirty minutes from contacting the catalyst.

2. The reactive ink for ink jet printing according to claim 1, wherein said polymerizable monomer is able to form a polymeric film at a temperature equal to or lower than 60° C. within ten minutes from contacting the catalyst.

3. The reactive ink for ink jet printing according to claim 1, wherein said polymerizable monomer is able to form a polymeric film at a temperature equal to or lower than 60° C. within one minute from contacting the catalyst.

4. The reactive ink for ink jet printing according to claim 1, wherein said polymerizable monomer is able to form a polymeric film at a temperature equal to or lower than 40° C.

5. The reactive ink for ink jet printing according to claim 1, wherein said polymerizable monomer is able to form a polymeric film at a temperature ranging from 10° to 30° C.

6. The reactive ink for ink jet printing according to claim 1, wherein said polymerization catalyst is a compound able to promote the acid (cationic) polymerization of the said polymerizable monomer.

7. The reactive ink for ink jet printing according to claim 1, wherein said polymerization catalyst is selected from the group consisting of mineral acids, organic sulfonic acids, superacids, and mixtures thereof.

8. The reactive ink for ink jet printing according to claim 1, wherein said first component and said second component are mixed, upon printing, in an amount so as to provide a weight ratio between said polymerizable monomer and said polymerization catalyst ranging from 1:1 to 1:5.

9. The reactive ink for ink jet printing according to claim 8, wherein said weight ratio ranges from 1:1 to 1:3.

10. The reactive ink for ink jet printing according to claim 1, wherein said first component and said second component further comprises at least one component selected from the group consisting of colorants, surfactants, defoamers, sequestering agents, and biocides.

11. A process of making an image on a non-porous substrate, the process comprising:
   jetting a reactive ink composition onto said non-porous substrate,
   wherein said reactive ink composition comprises
      an organic solvent as a carrier medium,
      a first component comprising a polymerizable monomer selected from the group consisting of aliphatic epoxy monomers, alicyclic epoxy monomers, aromatic epoxy monomers, and mixtures thereof, and
      a second component comprising a polymerization catalyst selected from the group consisting of Lewis and Bronsted acids having a pKa equal to or lower than 4,
   wherein the polymerizable monomer is able to form a polymeric film at a temperature equal to or lower than 60° C. within thirty minutes from contacting the catalyst.

12. The process according to claim 11, wherein said first component is jetted separately from said second component.

13. The process according to claim 12, wherein said first component is jetted simultaneously with said second component.

14. The process according to claim 12, wherein said first component is jetted after the jetting of said second component.

15. The process according to claim 12, wherein said first component is jetted before the jetting of said second component.

16. The process according to claim 11, wherein said polymerizable monomer is able to form a polymeric film at a temperature equal to or lower than 60° C. within ten minutes from contacting the catalyst.

17. The process according to claim 11, wherein said polymerization catalyst is a compound able to promote the acid (cationic) polymerization of the said polymerizable monomer.

18. An ink jet print head including a two component ink-system, comprising:
- a first tank including a first ink component comprising an organic solvent as a carrier medium and a polymerizable monomer selected from the group consisting of aliphatic epoxy monomers, alicyclic epoxy monomers, aromatic epoxy monomers, and mixtures thereof,
- a second tank including a second ink component comprising the organic solvent as the carrier medium and a polymerization catalyst selected from the group consisting of Lewis and Bronsted acids having a pKa equal to or lower than 4, and
- separate ejection systems for the first and second ink components, wherein the polymerizable monomer is able to form a polymeric film at a temperature equal to or lower than 60° C. within thirty minutes from contacting the catalyst.

19. The reactive ink for ink jet printing according to claim 1, wherein said first component and said second component are mixed, upon printing, in an amount so as to provide a weight ratio between said polymerizable monomer and said polymerization catalyst ranging from 1:1 to 1:10.

* * * * *